Patented Oct. 10, 1939

2,175,215

UNITED STATES PATENT OFFICE 2,175,215

SYNTHETIC RESINS

Israel Rosenblum, Jackson Heights,
Long Island, N. Y.

No Drawing. Application April 26, 1934,
Serial No. 722,608

7 Claims. (Cl. 260—19)

My invention relates to synthetic resins and it is one of the objects thereof to provide a synthetic resin which is soluble in the usual varnish solvents and is capable of producing a varnish having great durability and high resistance, is water and weather-proof, and dries with a superior finish. More particularly, it is an object of the invention to provide a resin which can be dissolved in China-wood oil at temperatures considerably below those heretofore necessary for dissolving resins in such vehicle.

It is the general object of the invention to produce oil-soluble resins with which varnishes can be made which yield very durable coatings, the resins being oil-soluble without the aid of rosin (which is detrimental to the longevity of a varnish film), although rosin and other natural resins may be incorporated in the product, the latter being preferably also substantially neutral. It is also an object of the invention to provide an improved method for the production of phenol-aldehyde resins which are soluble in oil with great ease even when the aldehyde, specifically formaldehyde, is bound in large quantities.

It is a further object of the invention to produce resinous complexes derived by condensation of a phenol and an aldehyde, such as formaldehyde, only to the initial stages and then proceeding further with the condensation in the presence of a partial ester, such as mono or di-linoleic glycerol ester or equivalent; and preferably by condensing a phenol with formaldehyde in the presence of mono or di-glycerol ester and finally neutralizing the remaining OH groups (alcoholic) with a fatty acid obtained from a drying or non drying oil or from a fat.

It is also an object of the invention to provide a resin which is suitable for use as a varnish and which is in a more or less reactive state, the same containing free basic hydroxyl groups capable of being combined with one or more of the various acidic substances, such as free fatty acids, etc., commonly employed in varnish-making.

Briefly described, the present invention comprises condensing a phenol or a naphthol, including the higher homologues or substitution products of phenol, such as butyl and amyl phenol, or mixtures thereof, with an aldehyde in the presence of one or more partial esters of a polyhydric alcohol with one or more high molecular weight fatty acids, such as linoleic acid, ricinoleic acid, the acids obtainable upon hydrolysis of China-wood oil, cotton-seed oil, etc., the acids obtained from drying and semi-drying oils being preferred. The quantities of the reacting materials are so chosen that the resulting product comprises a mixed ester of the polyhydric alcohol and both the fatty acid and the phenol-aldehyde condensate, such ester having free unesterified hydroxyl groups which can, if desired, be caused to react with any suitable acidic material, such as free fatty acids, rosin, etc. I prefer to carry on the above reaction in the presence of a salt of calcium, barium, strontium, zinc, lead, manganese, cobalt, and, in certain instances, of the alkali metals and other metals, particularly the organic salts of these metals and preferably organic salts of zinc of high molecular weight, such as the resinate, (e. g. abietate), oleate, tungate, stearate, etc., although the acetate and other comparatively low molecular weight organic salts of zinc or of the other metals may be employed. When, for example, glycerol monolinoleate is the partial polyhydric alcohol ester employed and the same is present during the condensation, for example, of phenol and formaldehyde in the presence of zinc abietate, there is produced, according to my invention, a highly complex resin which probably contains a mixed glyceride of linoleic acid and the acidic phenol-formaldehyde-zinc salt condensate, such glyceride containing free alcohol hydroxyl groups which are capable of reacting with other acidic materials. Where, for example, glycerol di-linoleate is employed, I prefer to use only so much phenol and formaldehyde that the resulting phenolic condensate is insufficient completely to esterify the partial glyceridic ester.

The partial glycerol esters of the fatty oil or fat acids are produced in known manner by reacting 1 mol of glycerol with approximately 1 mol of the acid to form the mono-ester, and with two mols of the acid to form the di-ester, the unesterified hydroxyls being free to react with the phenolic condensate, as will be described below.

My invention will be described more specifically by means of several examples, but it is to be understood that the latter are given by way of illustration only and in no sense limit the invention.

*Example 1*

|  | Parts |
|---|---|
| Phenol | 100 |
| Formaldehyde (40% solution; or 200 parts of the 20% solution) | 100 |
| Glycerol mono linoleate | 100 | are heated under reflux at about 100° C., for about 12 to 50 hours, depending upon the consistency desired, preferably in the presence of an organic salt, such as zinc abietate, the latter being present in quantity up to about 0.5% of the reacting materials. After distillation of the water, the heating is continued at a higher temperature, e. g., 130° C. When the reaction is complete there is obtained a liquid resin which can be worked up with China-wood oil at a comparatively low temperature (e. g., 450° F.) to produce a highly resistant varnish. There is thus avoided the danger of gelling of the China-wood oil varnish which frequently occurs when the same is heated to the usual temperature of approximately 580° F. with the varnish making materials heretofore employed.

Example 2

|  | Parts |
| --- | --- |
| Amyl phenol | 100 |
| Phenol (carbolic acid) | 100 |
| 40% formaldehyde solution | 236 |
| Glycerol mono linoleate | 200 | are heated at boiling point under reflux for about 16 hours in the presence of 0.5 parts of zinc acetate. After distillation of the water, the temperature is raised to 150° C. and the heating continued at such temperature. A viscous resin is obtained which is compatible with drying oils at usual varnish-making temperatures, the products being soluble in turpentine, coal tar solvents and mixtures of these with mineral spirits.

Example 3

|  | Parts |
| --- | --- |
| 92% paracresol | 100 |
| 40% formaldehyde solution | 105 |
| Glycerol mono linoleate | 100 |
| Zinc acetate | 0.25 | are condensed at the boiling point under reflux for about 16 hours. After distillation of the water, the heating is continued at about 150° C. A plastic resin is obtained, which on heating is compatible with drying oils, giving varnishes of good solubility in turpentine, coal tar solvents, etc.

Example 4

Same as Examples 1, 2 and 3, except that the still available free basic hydroxyl groups are subsequently esterified with any desired acidic material such as linoleic acid, stearic acid, rosin, etc. In place of the glycerol linoleate, there may be employed corresponding compounds of other fatty acids obtainable from oils and fats, such as the stearate, oleate, palmitate, ricinoleate, the partial glycerol esters of tung oil acids, etc. The esterified products are readily soluble in varnish oils, so that varnishes of any length can be obtained. They can be thinned with turpentine, coal tar solvents and mixtures of these with mineral spirits.

Example 5

|  | Parts |
| --- | --- |
| Amyl phenol | 100 |
| 40% formaldehyde solution | 140 |
| Glycerol dilinoleate | 25 |
| Zinc acetate | 0.6 | are condensed for 16 hours at the boiling point under reflux. The heating is then continued until the temperature of 250° C. is reached at which temperature the material is kept for 2-3 hours. A solid resin is obtained, which is compatible with drying oils and gives varnishes of great resistance and durability. Turpentine, coal tar solvents and mixtures of these with petroleum distillates can be used for thinning these varnishes.

Example 6

Same as Example 5, except that instead of amyl phenol, diisobutylphenol is used. A resin is obtained having properties similar to those of the resin obtained according to Example 5.

While the phenol and aldehyde may be caused to condense separately and then mixed with the partial ester or esters, provided that precautions are taken to avoid hardening of the phenolic condensate because of the large amount of aldehyde employed, I prefer to mix all of the ingredients together and conduct the reaction in a single stage so that the partial ester acts as a solvent for the phenol-formaldehyde condensate and retards or prevents the complete hardening of the latter.

Variations may be resorted to within the scope of the appended claims without departing from the spirit of the invention.

It will be understood that where I specify the partial polyhydric alcohol ester of an acid obtainable upon hydrolysis of a fatty oil or fat it is not essential to employ the pure single ester, but that the mixture of esters obtained by reacting an excess of the polyhydric alcohol with the mixture of acids obtained from an oil or fat can be utilized.

The present application is a continuation in part of my copending application Ser. No. 483,131, filed September 19, 1930.

From the above it will be seen that I have devised a process for the production of resins containing a large proportion of a phenol-aldehyde condensate and which are yet soluble in oil without the aid of rosin. Thus in Examples 1, 2 and 3 the phenol-aldehyde resin compound comprises about 50% and even somewhat more of the total resinous product; while in Examples 5 and 6, it is present in several times the quantity of the glycerol-fatty acid basic (or partial) ester. This property of oil-solubility is particularly striking when the phenol employed consists entirely or in large part of ordinary phenol (carbolic acid), since condensation products of phenol and formaldehyde in commercial proportions, and especially with high proportions of formaldehyde (1:1 or above), are not soluble in varnish oils. However, if desired, rosin or other natural resin or ester gums may be added to or reacted with the materials specified in the above examples; thus, as already indicated, rosin may be utilized to neutralize any excess glycerol or other polyhydric alcohol hydroxyls that may be present.

I claim:

1. The method of producing oil-soluble resins which comprises reacting essentially approximately 100 parts of amyl phenol, 100 parts of phenol, 94 parts of formaldehyde (100%) and 200 parts of the monoglyceride of a drying oil acid until an oil-soluble condensate is obtained.

2. The method of producing oil-soluble phenolic resins, which comprises essentially condensing a phenol, an aldehyde, an organic salt of a metal of the group consisting of the first and second groups of the periodic system, lead, cobalt and manganese, and the oil-soluble hydroxyester or esters obtained by reacting glycerol with considerably less than the equivalent amount of a fatty oil acid, the quantities of the reacting materials being such that the resulting product theoretically contains free basic hydroxyls.

3. The method of producing oil-soluble phenolic resins, which comprises essentially condensing a phenol, formaldehyde, an organic salt of a metal of the group consisting of the first and second groups of the periodic system, lead, cobalt and manganese, and the oil-soluble hydroxy-ester or esters obtained by reacting glycerol with considerably less than the equivalent amount of a fatty oil acid, the amount of phenol being approximately equal to that of the glycerol hydroxy-esters.

4. The method of producing oil-soluble phenolic resins, which comprises essentially condensing phenol, formaldehyde, an organic salt of zinc and the oil-soluble hydroxy ester or esters obtained by reacting glycerol with considerably less than the equivalent amount of the acids of linseed oil, the quantities of the reacting materials being such that the resulting product theoretically contains free basic hydroxyls.

5. A fusible, oil-soluble resin consisting essentially of the reaction product of a phenol, an aldehyde, an organic salt of a metal, and the hydroxy-ester of a polyhydric alcohol and a fatty acid obtainable on hydrolysis of a fatty oil or fat.

6. The method of producing oil-soluble phenolic resins which comprises essentially heating one gram-molecule of a phenol with more than one gram-molecule of formaldehyde in the presence of approximately 100 grams of a hydroxy-ester of glycerol and a fatty acid obtainable on hydrolysis of a fatty oil or a fat.

7. The method of producing resinous compositions soluble in varnish oils, which comprises essentially condensing a phenol and formaldehyde in the presence of the oil-soluble hydroxy-ester or esters obtained by reacting glycerol with considerably less than the equivalent amount of the acids of a drying oil, the said hydroxy esters being in excess of the amount required to neutralize the phenol-formaldehyde condensate, and substantially neutralizing the excess hydroxyl groups with an acidic natural resin.

ISRAEL ROSENBLUM.